July 22, 1952     C. C. DUBBS ET AL     2,603,850
METHOD AND APPARATUS FOR MOLDING CONCRETE PRODUCTS
Filed April 26, 1950
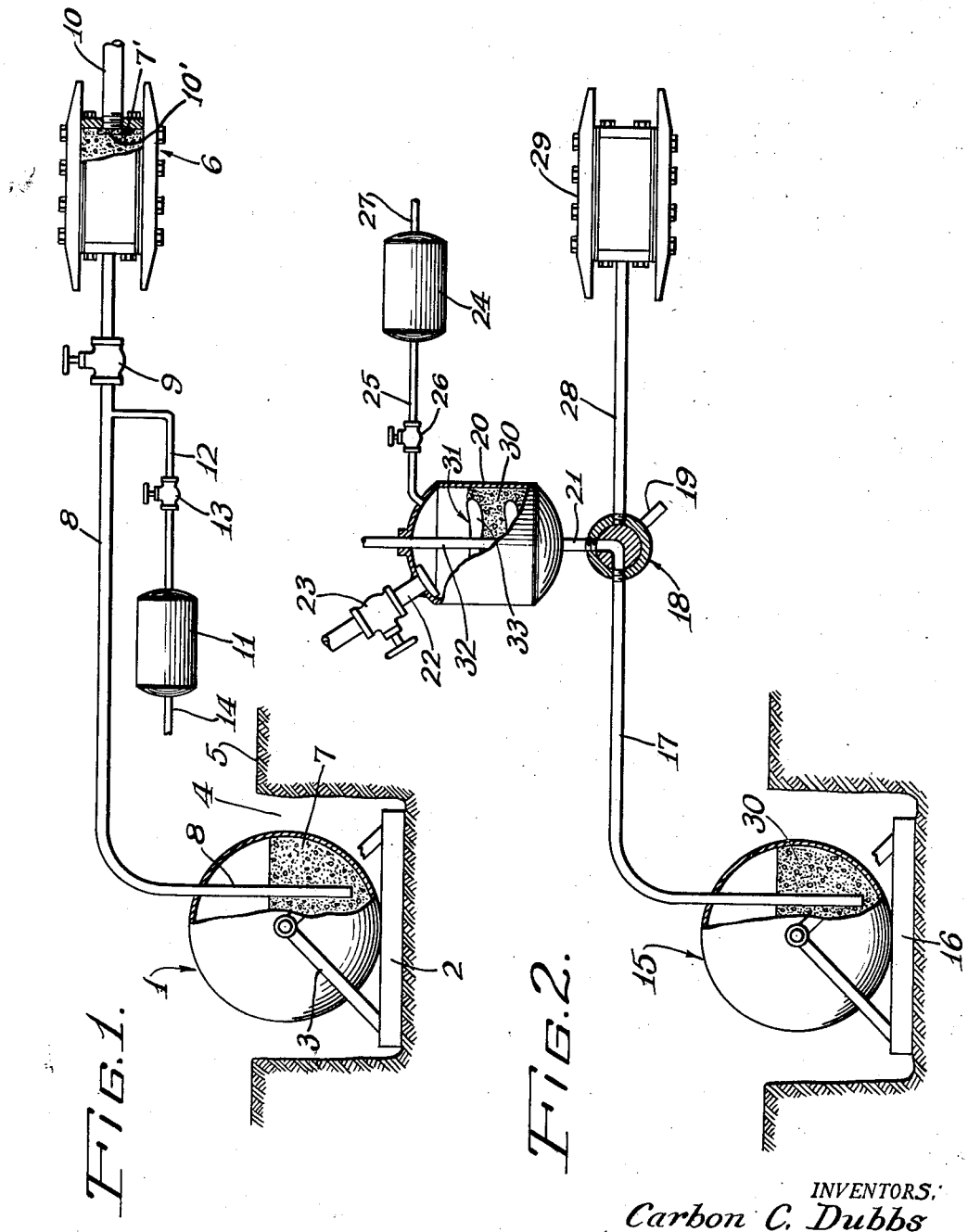
INVENTORS.
Carbon C. Dubbs
Richard E. Gosting
By Gary, Desmond & Parker
Attys.

Patented July 22, 1952

2,603,850

UNITED STATES PATENT OFFICE 2,603,850

METHOD AND APPARATUS FOR MOLDING CONCRETE PRODUCTS

Carbon C. Dubbs, Orange, and Richard E. Gosting, Whittier, Calif.; said Gosting assignor to said Dubbs Application April 26, 1950, Serial No. 158,288

7 Claims. (Cl. 25—41)

This invention relates to improvements in a process and apparatus for molding concrete products and refers to a process and apparatus for feeding a relatively fluid concrete mixture from a source of supply to an enclosed mold and returning excess mixture to said source of supply when the enclosed mold is completely filled.

In copending applications for patent Serial Nos. 121,802, 123,656 and 128,975, now Patent No. 2,528,643, filed respectively on October 17, 1949, October 26, 1949, and November 23, 1949, filed in the name of Carbon C. Dubbs, processes and apparatuses for making concrete products are shown and described wherein a concrete mixture is deposited in a completely enclosed mold, the mixture while in the mold has been pressurized to compact the mixture and remove excess water therefrom so that the formed product can be immediately demolded, thus permitting immediate availability of the mold for the making of another product.

In copending application for patent Serial No. 128,416, filed November 19, 1949, in the name of Carbon C. Dubbs a hollow masonry product is shown and described which is made by the processes and apparatuses of the first mentioned applications for patent.

In application for patent Serial No. 157,343, field April 21, 1950, in the name of Carbon C. Dubbs, process and apparatus is shown and described for charging a relatively fluid concrete mixture to a mold where it is compacted and formed into a hollow masonry product.

The present invention deals with another method and apparatus for charging a relatively fluid concrete mixture to an enclosed mold to completely fill the mold whereby a concrete product may be formed, provision being made for returning the excess concrete mixture to the source of supply.

In employing concrete mixtures of sufficient fluidity to pass through pipes or conduits difficulty is frequently encountered in preventing premature settling or segregating of the solid components of the mixture from the fluid component. If the mixture remains quiescent for a predetermined period of time there is a tendency for such separation to occur.

Accordingly, one of the important features of the present invention resides in a procedure whereby the relatively fluid concrete mixture is fed to an enclosed mold and when the mold has been completely filled, the excess mixture may be quickly returned to the source of supply where it is maintained in agitated condition.

Another feature of the invention resides in the arrangement of parts whereby the return of excess concrete mixture takes place with the assistance of gravity, that is, it moves downwardly thereby permitting the rapid return of the excess mix to the source.

Other objects and advantages of the present invention will be apparent from the accompanying drawing and following detailed description.

In drawing,

Fig. 1 is a diagrammatic view of suitable apparatus for carrying out the process of the present invention.

Fig. 2 is a diagrammatic view of a modification of the invention.

Referring in detail to the drawing, 1 indicates generally a concrete mixer of conventional construction. The mixer 1 is provided with internally rotating blades or vanes (not shown) which may be driven from a suitable source of power (not shown). The mixer 1 may be mounted upon a base 2 and is carried upon supporting elements 3. In carrying out my invention the mixer 1 is preferably mounted in a sump 4 beneath the surface 5 of the ground or other supporting surfaces. The mixer is shown and described as being below the surface of the ground, but this position of the mixer is merely relative since it is desirable that the mixer comprise the lowest portion of the machine as will be hereinafter more fully described.

A mold 6 is employed for forming the concrete product which is made in accordance with my invention. The mold is preferably of the type described in the copending patent applications hereinbefore identified, particularly Serial Nos. 121,802 and 123,656. In view of the fact that the mixture of concrete 7 is relatively fluid, the mold 6 is preferably of such character that in forming the concrete product the excess water will be expressed from the mixture.

A pipe 8 is positioned in the mixer 1 and said pipe connects with the interior of mold 6 through control valve 9. Preferably, the mold 6 is positioned at a higher level than the mixer 1. A pipe 10 connects into the interior of the mold 6, preferably at the end of the mold opposite to the feed pipe 8. At the opposite end of pipe 10, said pipe may be connected to a suitable source of vacuum (not shown) such as a conventional vacuum pump.

A tank 11 is connected to pipe 8 by means of a pipe 12, interposed in which is a valve 13. The pipe 12 connects into pipe 8 upon that side of pipe 8 which is remote from the mold 6. A pipe 14 connects into tank 11 and at its opposite end said pipe connects with a suitable source of fluid under pressure (not shown).

In utilizing the apparatus illustrated in Fig. 1 a suitable relatively high fluid mixture of concrete is mixed in the mixer 1. Vacuum is established in the interior of the mold 6 by means of the pipe 10, and with valve 9 open and valve 13 closed a quantity of concrete mix 7 is drawn upwardly through pipe 8 to the interior of mold 6. A filter member 10' may be secured over the mouth of pipe 10 to prevent the passage of solid material through said pipe. In the mold 6 excess water is drawn from the mix and the concrete 7' within the mold is densified and takes the form of the inside of the mold. After the mold 6 has been filled with compacted concrete, valve 9 is closed and valve 13 is open whereby the excess concrete mix in pipe 8 is forced under superatmospheric pressure back to the mixer 1. The formed concrete 7' is then removed from the mold as a completed product. The operation may then be repeated.

Referring particularly to Fig. 2 a slight modification of apparatus for carrying out the process is shown. In this form of apparatus a concrete mixer 15 similar to mixer 1 is positioned upon a suitable base 16. A pipe 17 connects into the mixer 15 at one end, the mouth of the pipe being positioned adjacent the bottom of the mixer. The opposite end of pipe 17 connects into a 3-way valve 18, said valve being manipulated by a suitable handle 19.

A receptacle 20 is connected by means of pipe 21 at its lower portion to the 3-way valve 18. A pipe 22 controlled by valve 23 connects into the upper portion of the receptacle 20, the opposite end of said pipe being connected to a suitable source of vacuum (not shown).

A tank 24 is connected by means of pipe 25 to the upper portion of receptacle 20, communication between the tank 24 and the receptacle 20 being controlled by valve 26. A pipe 27 connects into tank 24 and at its opposite end said pipe connects with a suitable source of fluid under pressure (not shown).

The third connection of the 3-way valve 18 is connected to pipe 28 which, in turn, connects with a mold 29. The mold 29 may be similar to mold 6 except that mold 29 is not connected to a source of vacuum.

In operating the device illustrated in Fig. 2 a suitable relatively fluid concrete mixture 30 is mixed in the mixer 15. The 3-way valve 18 is so manipulated as to connect pipes 17 and 21. With valve 26 closed, valve 23 is opened thereby establishing within receptacle 20 a condition of vacuum within said receptacle. The vacuum draws a predetermined quantity of concrete mixture 30 from the mixer 15 to the receptacle 20. When a quantity of the concrete mix 30 has been drawn into receptacle 20 the 3-way valve is manipulated to connect pipes 21 and 28. Valve 23 is then closed and valve 26 is opened whereby the fluid under pressure from tank 24 forces the concrete mixture 30 through pipes 21 and 28 to the mold 29. The excess water of the concrete mixture within mold 29 is expressed, as contemplated in the applications for patent hereinbefore identified.

When the mold 29 has been completely filled with compact concrete, valve 18 is manipulated to connect pipe 21 to pipe 17 whereby the excess concrete mixture 30 is returned to the mixer 15. Thereafter the compact concrete product may be removed from the mold 29.

In view of the fact that the present invention relies upon the transmission of the concrete mixture through pipes, it is desirable that the concrete mixture be relatively fluid. One of the factors which determines the fluidity or stability of the concrete mixture is the type of aggregate employed in the mixture. Although relatively heavy aggregate can be employed in the present invention, preferably the aggregate used in the mixture is of the light weight type, such as, pumice, exfoliated mica, expanded perlite or any of the synthetic or manufactured types of light weight aggregate. In general the concrete mixture employed in the present invention is of a character contemplated in the application for patent, hereinbefore identified, Serial No. 157,343.

In order to maintain the stability of the concrete mixture it is desirable that the mixture not be permitted to remain quiescent for any appreciable period of time. Consequently, it has been found desirable to maintain the concrete mixture 30 in receptacle 20 in an agitated condition, and to accomplish this end an agitating mechanism 31 may be positioned in receptacle 20. The mechanism 31 may comprise a rotating shaft 32 carrying a plurality of paddles or vanes 33. The shaft 32 may be rotated by any suitable source of power (not shown). Hence, while the mixture 30 is being drawn into the receptacle 20 and is being discharged therefrom to the mold 29, the solid components of the mixture are maintained in suspension by the agitating mechanism 31. When the mold 29 has been completely filled with the compacted concrete mixture the excess mixture 30 is immediately returned to the mixer 15. In order to facilitate the return of the excess concrete mixture to the mixer, the mixer is preferably maintained at a level beneath the remaining portions of the apparatus.

It is apparent that many modifications of the present invention may be made without departing from the spirit of the invention and, hence, the present invention is not to be limited except as indicated in the appended claims.

We claim as our invention:

1. A method of molding concrete products which comprises maintaining a source of supply of a relatively fluid concrete mixture, lifting a predetermined quantity of said mixture from said source by sub-atmospheric pressure and passing a portion thereof to an enclosed mold, said quantity being in excess of the capacity of the mold, forming a concrete product in said mold, and returning a major portion of the excess concrete mixture under super-atmospheric pressure to said source of supply.

2. A method of molding concrete products which comprises maintaining a source of supply of a relatively fluid concrete mixture, agitating said mixture to prevent segregation of the components thereof, lifting a predetermined quantity of said mixture from said source by sub-atmospheric pressure and passing a portion thereof to an enclosed mold, said quantity being in excess of the capacity of the mold, forming a concrete product in said mold, and returning a major portion of the excess concrete mixture under super-atmospheric pressure to said source of supply.

3. A method of molding concrete products which comprises maintaining a source of supply of a relatively fluid concrete mixture, lifting a predetermined quantity of said mixture from said source by sub-atmospheric pressure and passing a portion thereof to an enclosed mold, said quantity being in excess of the capacity of the mold, compacting said concrete product in said mold and expressing excess water therefrom, removing said water from the mold, and returning a major portion of the excess concrete mixture under super-atmospheric pressure to said source of supply.

4. A method of molding concrete products which comprises maintaining a source of supply of a relatively fluid concrete mixture, lifting a predetermined quantity of said mixture and passing a portion thereof to an enclosed mold by sub-atmospheric pressure, said quantity being in excess of the capacity of the mold, forming a concrete product in said mold, and returning a portion of the excess concrete mixture under super-atmospheric pressure to said source of supply.

5. A method of molding concrete products which comprises maintaining a source of supply of a relatively fluid concrete mixture, lifting a predetermined quantity of said mixture by sub-atmospheric pressure and passing a portion thereof to an enclosed zone, establishing a condition of super-atmospheric pressure in said zone to force a portion of the concrete mixture therein to an enclosed mold, said quantity being in excess of the capacity of the mold, forming a concrete product in said mold, and returning a major portion of the excess concrete mixture from said zone under said super-atmospheric pressure to said source of supply.

6. A method of molding concrete products which comprises maintaining a source of supply of a relatively fluid concrete mixture, lifting a predetermined quantity of said mixture by sub-atmospheric pressure and passing a portion thereof to an enclosed zone, agitating the concrete mixture in said zone, establishing a condition of super-atmospheric pressure in said zone to force a portion of the concrete mixture therein to an enclosed mold, said quantity being in excess of the capacity of the mold, forming a concrete product in said mold, and returning a major portion of the excess concrete mixture from said zone under super-atmospheric pressure to said source of supply.

7. A device for molding concrete products which comprises a mold for forming a concrete product, a container for carrying a bulk supply of a relatively fluid concrete mixture, all portions of said container being positioned at a lower elevation than said mold, a pipe connecting into said container, all portions of the pipe between the mold and container being positioned above the container, means for establishing a condition of sub-atmospheric pressure in said pipe to lift concrete mixture from said container, means for passing a portion of said mixture upwardly to said mold, and means for forcing a major portion of the excess mixture drawn from said container and not passed to said mold downwardly back to said container under super-atmospheric pressure and gravity.

CARBON C. DUBBS.
RICHARD E. GOSTING.

REFERENCES CITED

The following references are of record in the file of this patent:

UNITED STATES PATENTS

| Number | Name | Date |
| --- | --- | --- |
| 722,464 | Stevens | Mar. 10, 1903 |
| 1,703,871 | Curtis | Mar. 5, 1929 |
| 2,422,809 | Stupakoff et al. | June 24, 1947 |